US011423920B2

(12) United States Patent
Sen et al.

(10) Patent No.: US 11,423,920 B2
(45) Date of Patent: Aug. 23, 2022

(54) METHODS AND SYSTEMS FOR SUPPRESSING VOCAL TRACKS

(71) Applicant: Rovi Guides, Inc., San Jose, CA (US)

(72) Inventors: Susanto Sen, Karnataka (IN); Shakir Sharfraz Ashfaq Ahamed, Karnataka (IN); Sriram Ponnuswamy, Tamil Nadu (IN)

(73) Assignee: Rovi Guides, Inc., San Jose, CA (US)

( * ) Notice: Subject to any disclaimer, the term of this patent is extended or adjusted under 35 U.S.C. 154(b) by 127 days.

(21) Appl. No.: 16/145,976

(22) Filed: Sep. 28, 2018

(65) Prior Publication Data

US 2020/0105286 A1 Apr. 2, 2020

(51) Int. Cl.
*G10L 15/00* (2013.01)
*G10L 15/04* (2013.01)
(Continued)

(52) U.S. Cl.
CPC .............. *G10L 21/00* (2013.01); *G10L 15/22* (2013.01); *G10L 25/24* (2013.01); *G10L 25/51* (2013.01)

(58) Field of Classification Search
CPC ......... G10L 15/22; G10L 15/26; G10L 15/02; G10L 15/265; G10L 25/24; G10L 15/08; G10L 19/167; G10L 2015/088; G10L 15/18; G10L 17/22; G10L 2015/226; G10L 21/0202; G10L 15/05; G10L 13/033; G10L 15/005; G10L 2021/0135; G10L 21/003; G10L 21/013; G10L 21/0205; G10L 21/0272; G10L 21/055; G10L 15/20; G10L 21/00; G10L 25/51; G06F 3/167; G06F 3/16; G06F 2203/0381; G06F 40/166; G06F 40/20; G06F 40/284; G06F 40/295; G06F 16/685; H04M 1/271; H04M 2250/74; H04N 21/2353; H04N 21/2743;
(Continued)

(56) References Cited

U.S. PATENT DOCUMENTS 5,278,943 A * 1/1994 Gasper ................... G10L 13/08
704/200
5,875,448 A * 2/1999 Boys ........................ G06F 3/16
704/201
(Continued)

OTHER PUBLICATIONS

Mesaros, Annamaria & Virtanen, Tuomas, "Automatic Recognition of Lyrics in Singing," EURASIP Journal on Audio, Speech, and Music Processing, vol. 2010, 11 pages (2009).

*Primary Examiner* — Michael Ortiz-Sanchez
(74) *Attorney, Agent, or Firm* — Haley Guiliano LLP (57) ABSTRACT

The methods and systems described herein aid users by modifying the presentation of content to users. For example, the methods and systems suppress the dialogue track of a movie when the user engages with the content by reciting a line of the movie as it is presented to the user. Words spoken by the user are detected and compared with the words in the movie. When the user is not engaging with the movie by reciting the lines or humming tunes while watching the movie, the audio track of the movie is not modified. Content can be modified in response to engagement by a single user or by multiple users (e.g., each reciting lines of a different character in a movie). Accordingly, the methods and systems described herein provide increased interest in and engagement with content.

20 Claims, 7 Drawing Sheets

(51) Int. Cl.
*G10L 21/00* (2013.01)
*G10L 25/51* (2013.01)
*G10L 15/22* (2006.01)
*G10L 25/24* (2013.01)

(58) Field of Classification Search
CPC .. H04N 21/812; H04N 21/4396; A63F 13/65; G09B 19/04; G09B 15/00; G09B 19/00; G09B 15/04; G09B 5/04; G10H 1/00; G10H 1/361; G10H 2210/086; G10H 2220/011; G10H 2210/091; G10H 2210/046; H04R 2227/005; H04R 27/00; H04R 29/007; H04R 3/005; H04R 3/12
See application file for complete search history.

(56) References Cited

U.S. PATENT DOCUMENTS

| | | | | |
|---|---|---|---|---|
| 5,880,788 | A * | 3/1999 | Bregler | G03B 31/02 345/473 |
| 5,889,223 | A | 3/1999 | Matsumoto | |
| 6,535,269 | B2 * | 3/2003 | Sherman | G03B 31/00 352/6 |
| 7,437,290 | B2 * | 10/2008 | Danieli | G10L 15/08 704/251 |
| 7,761,892 | B2 | 7/2010 | Ellis et al. | |
| 8,046,801 | B2 | 10/2011 | Ellis et al. | |
| 8,284,905 | B1 * | 10/2012 | Suri | H04M 3/2281 379/265.07 |
| 8,296,130 | B2 * | 10/2012 | Spears | G06F 40/10 704/9 |
| 8,831,953 | B2 * | 9/2014 | Vanjani | G10L 15/183 704/1 |
| 9,514,750 | B1 * | 12/2016 | Harris | G10L 15/22 |
| 9,672,815 | B2 * | 6/2017 | Ganapathiraju | G10L 15/08 |
| 10,431,216 | B1 * | 10/2019 | Lemon | G06F 3/0488 |
| 2001/0008753 | A1 * | 7/2001 | Wakamoto | G09B 19/06 434/156 |
| 2002/0097380 | A1 * | 7/2002 | Moulton | G11B 27/028 352/5 |
| 2004/0177744 | A1 * | 9/2004 | Strasser | G09B 19/00 84/470 R |
| 2005/0042591 | A1 * | 2/2005 | Bloom | G11B 27/034 434/307 A |
| 2005/0251827 | A1 | 11/2005 | Ellis et al. | |
| 2006/0008092 | A1 * | 1/2006 | Baril | G09B 15/00 381/77 |
| 2006/0095262 | A1 * | 5/2006 | Danieli | G10L 21/00 704/E21.001 |
| 2007/0120975 | A1 | 5/2007 | Tsai et al. | |
| 2007/0250901 | A1 * | 10/2007 | McIntire | H04N 21/8586 725/146 |
| 2008/0113325 | A1 * | 5/2008 | Mellqvist | G06Q 30/0601 434/307 A |
| 2008/0184870 | A1 * | 8/2008 | Toivola | G10H 1/365 84/610 |
| 2010/0250257 | A1 * | 9/2010 | Hirose | G10L 13/033 704/278 |
| 2014/0163980 | A1 * | 6/2014 | Tesch | G10L 25/57 704/235 |
| 2014/0201631 | A1 * | 7/2014 | Pornprasitsakul | G11B 27/031 715/716 |
| 2015/0199978 | A1 * | 7/2015 | McCoy | G10L 21/10 704/270 |
| 2015/0363899 | A1 * | 12/2015 | Krause | G06Q 30/08 705/26.3 |
| 2017/0242653 | A1 * | 8/2017 | Lang | H04L 12/2809 |
| 2017/0337913 | A1 * | 11/2017 | Guegan | G10H 1/361 |
| 2018/0108351 | A1 * | 4/2018 | Beckhardt | G06F 3/165 |
| 2019/0132372 | A1 * | 5/2019 | Litsyn | H04N 21/4622 |
| 2019/0318757 | A1 * | 10/2019 | Chen | G10L 17/04 |
| 2020/0013422 | A1 * | 1/2020 | Matkin | G10L 21/0232 |
| 2020/0092607 | A1 * | 3/2020 | Rechner | G06F 40/284 |

* cited by examiner

METHODS AND SYSTEMS FOR SUPPRESSING VOCAL TRACKS

BACKGROUND

The present disclosure relates to content output systems and, more particularly, to content output systems that modify content in response to user engagement.

SUMMARY

Methods and systems are described herein for modifying the presentation of content to users. Content today is accessed through a variety of devices and in various settings. In some situations, content is passively watched or listened to by users. In other situations, a user may be at least partially engaged with the content. For example, when a user watches a movie a second time, the user may recite one or more memorable lines while the movie is being presented. Such recitals may even replicate the pacing and inflection of the voice of the character who said the lines in the movie. In conventional systems, the content continues to be presented the same way regardless of whether a user is engaging with the content. This can lead to lack of user engagement and interest in the content, especially in view of how many sources and types of content are available today.

The solution to the problems described above includes identifying user engagement and modifying the presentation of the content in response. For example, when a user recites a line of a movie while watching the movie, this engagement can be identified, and the vocal track of the movie can be suppressed in response. When the user is not reciting lines of the movie, the vocal track can be presented unaffected. Content can be modified in response to engagement by a single user or by multiple users (e.g., each reciting lines of a different character in a movie). Accordingly, the methods and systems described herein provide increased interest in and engagement with content.

Systems and methods are described herein for a content application that suppresses vocal tracks in content upon detection of a user uttering the corresponding words. In some embodiments, the application detects during output of content (e.g., a movie), an utterance of the user, where the content includes a vocal track and at least one additional audio track. The application determines at least one first word in the detected utterance of the user. For example, the determined words may match words spoken in the movie or may be about something unrelated to the movie. The application also determines at least one second word included in a portion of the content that was output at a time when the at least one first word was uttered by the user. The application compares the at least one first word with the at least one second word and determines, based on the comparison, whether there is a match. In response to determining that the at least one first word matches the at least one second word, the content application suppresses output of the vocal track of the content.

It should be noted that the methods and systems described herein for one embodiment may be combined with other embodiments as discussed herein.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Methods and systems are described herein for modifying content being presented to users and, more particularly, for suppressing audio (e.g., a dialogue track) of the content.

Figure 1:
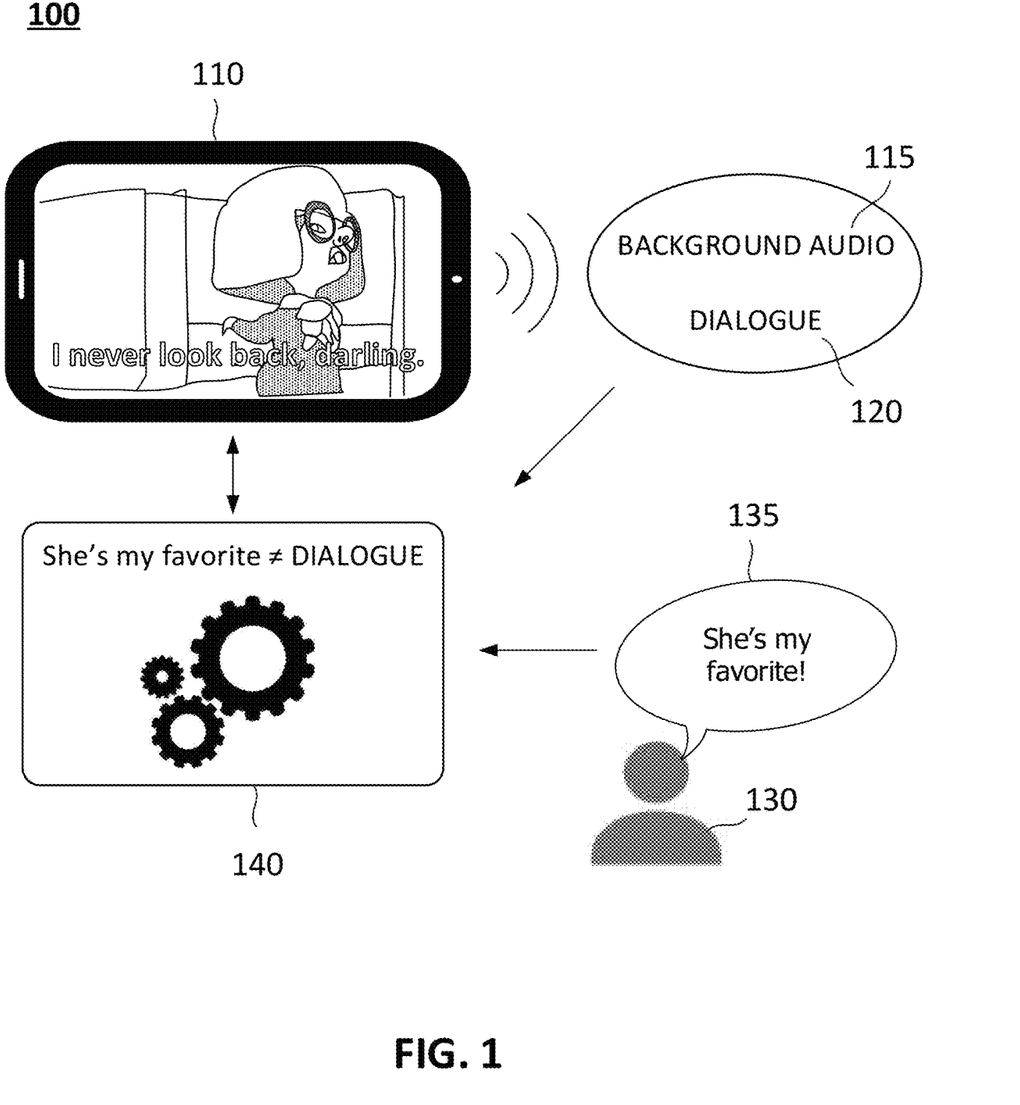
FIG. 1 shows an illustrative example of a content output system outputting the dialogue track of content, in accordance with some embodiments of the disclosure.

FIG. 1 shows an illustrative example of a content output system 100 playing the dialogue track 120 of content, in accordance with some embodiments of the disclosure. As referred to herein, the term "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, playlists, electronic books, social media, applications, games, and/or any other media and/or combination of the same. Content may be recorded, played, displayed or accessed by devices, but can also be part of a live performance. Content output system 100 includes a device 110 that plays the content, which includes both audio and visual content. Device 110 can be a smartphone, tablet, virtual reality headset, television, any suitable hardware that generates audio and visual content for consumption, or any suitable combination thereof. As illustrated, the audio content includes both a background audio track 115 and a dialogue track 120. As referred to herein, the term "track" should be understood to mean any singular or combination of audio content (e.g., a file comprising a recording of music, sounds of explosions, and actor dialogue may be considered to include multiple audio tracks). Multiple audio tracks can be stored and played as a single file or as multiple files.

While device 110 provides content to user 130, content output system 100 monitors sounds made by the user (e.g., using control circuitry 140). Users may make many different kinds of sounds while content is being presented. For example, the user may be talking to a friend, humming, speaking about the content, singing along with music in the content, or reciting the dialogue of the content. As illustrated by speech bubble 135, user 130 is commenting on the content being played by device 110. Specifically, the user states "She's my favorite!" about the character being displayed on device 110. As mentioned above, content output system 100 monitors the environment for sounds made by the user. The monitored sounds may include a single word or a fraction of a word. For example, user 130 may be listening to the soundtrack of a movie, where a song in the soundtrack uses a nonsense word such as "supercalifragilisticexpialidocious." In some embodiments, the content output system 100 identifies a match by comparing a fraction of a word with the dialogue track of the content provided by device 110. A match based on a portion of a word is particularly applicable to words less likely to be spoken. For example, dialogue tracks with words in a secondary language rather than the primary language of the content may be less likely to be said by user 130 by coincidence. Accordingly, in such situations, a single or even partially spoken word may be used by content output system 100 to determine whether the user is reciting words of the content.

Content output system 100 may use control circuitry 140 to perform speech processing. In some embodiments, control circuitry 140 is an embedded circuitry component of device 110. Control circuitry 140 may also be a stand-alone processing device that is physically separated from device 110 and is communicatively linked to the device 110 (e.g., using Wi-Fi, Zigbee, Bluetooth, etc.). For example, control circuitry 140 may be instructed to translate speech to text, and further match the resulting text to a database of movie scripts or song lyrics. In some embodiments, control circuitry 140 may be communicatively linked to the data repository of a content provider to receive the dialogue track of the movie or the transcription of the audio content. Control circuitry 140 may perform, but is not limited to performing, filtering, encoding, decoding, synthesis, analysis, or any suitable operation performed upon an audio signal converted to an electronic representation. In some embodiments, the electronic representations of the audio signal may include Mel-frequency cepstral coefficients (MFCCs). Furthermore, the audio signal may be represented by features such as intonation, pitch, volume, spectral roll-off, spectral flux, the spectral centroid, any other suitable component of audio, or any combination thereof.

As shown in FIG. 1, control circuitry 140 determines that the words spoken by user 130 (i.e., "She's my favorite!") do not match dialogue track 120. In some embodiments, control circuitry 140 is included in a voice assistant device. For example, as user 130 watches a movie on a tablet, the voice assistant device, which includes a microphone, picks up the user's audible reactions to the movie. In such embodiments, a communication link between the voice assistant device and the tablet may be used to control the output of the dialogue track of the movie presented on the tablet. Because user 130 in the illustrative example is commenting about a character on the display, content output system 100 determines that there is no match between the words spoken by the user and dialogue track 120. Because there is no match, the content output system 100 will continue to present the dialogue track 120 along with the background audio track 115.

Figure 2:
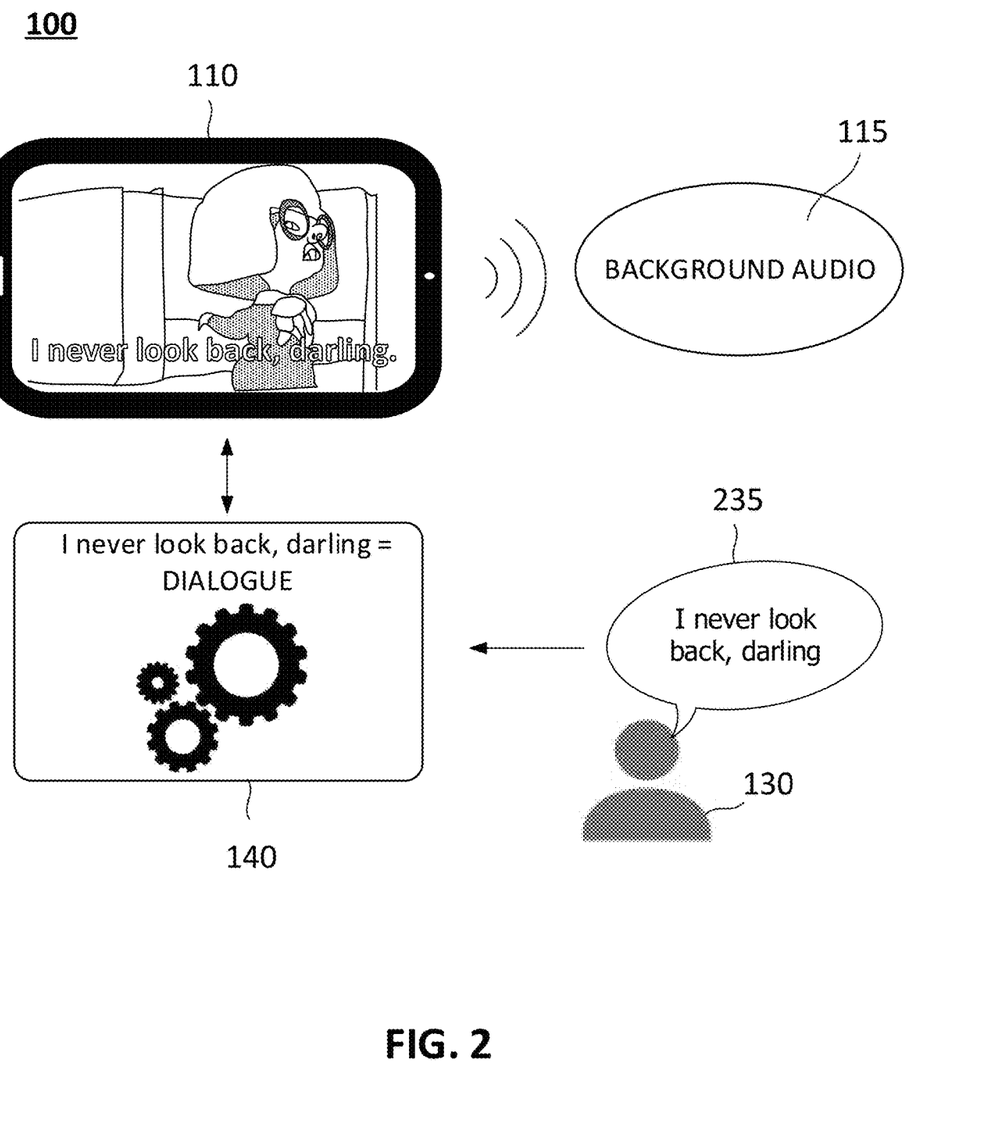
FIG. 2 shows an illustrative example of a content output system suppressing output of the dialogue track of content, in accordance with some embodiments of the disclosure.

FIG. 2 shows an illustrative example of content output system 100 suppressing output of the dialogue track of content, in accordance with some embodiments of the disclosure. For example, device 110 may be a tablet presenting a movie to user 130 who is engaging with the movie as shown in speech bubble 235 (e.g., reciting lines in the movie). In some embodiments, a communication link between control circuitry 140 and a cloud-based server containing a database of content audio can be used by control circuitry 140 to select different audio tracks for playback.

In some situations, control circuitry 140 will determine that there is a match between words spoken by user 130 and the dialogue track of the movie, as illustrated in FIG. 2. When there is a match, content output system 100 suppresses the dialogue track such that only background audio track 115 (e.g., sound effects, soundtrack music, and other background sounds) is output by device 110. In some embodiments, content output system 100 suppresses the dialogue track by applying a filter to remove the dialogue track from the movie's audio track (e.g., using a least mean squares adaptive filter, a median filtering of the spectrogram of the audio content at different frequency resolutions, etc.). The filtering may be accomplished using control circuitry 140, a remote server, or any suitable combination thereof. In some embodiments, content output system 100 suppresses the dialogue track by switching output from a first audio file comprising both background audio track 115 and a dialogue track to a second audio file comprising only background audio track 115. The aforementioned first and second audio files may be stored remotely on cloud-based storage or on device 110. Content output system 100 may begin suppressing dialogue when a match is determined after processing one or more words in a sentence. For example, content output system 100 may begin suppressing dialogue after "I never" is spoken by the user. In some embodiments, the dialogue track is suppressed for a predetermined number of words or amount of time after the user has stopped reciting the dialogue of the movie. For example, if user says "She is my favorite character" after reciting the line from the movie, content output system 100 may continue to output the dialogue track after the user says the word "favorite." In this example, the content output system waits until four dialogue words are not spoken by the user or after a predetermined amount of time since the last matched word was spoken (e.g., 5 seconds) before resuming output of the dialogue track.

Figure 3:
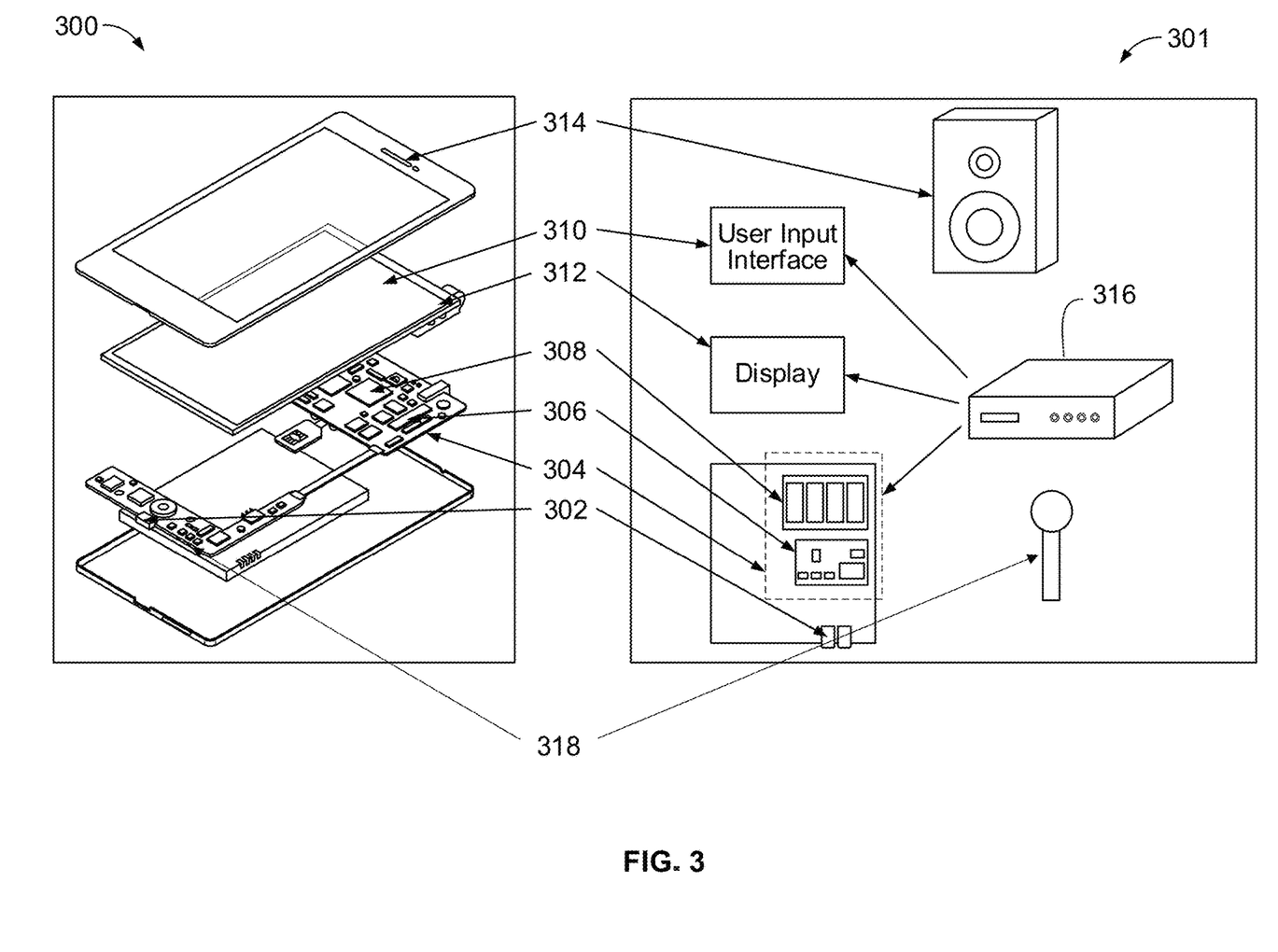
FIG. 3 is a block diagram of an illustrative device, in accordance with some embodiments of the disclosure.

Users may access contents for output from one or more of their devices. FIG. 3 shows generalized embodiments of illustrative device 110. For example, device 110 may be a smartphone device or a remote control. In another example, device 110 may be a user television equipment system. User television equipment system 110 may include a set-top box 316. Set-top box 316 may be communicatively connected to speaker 314, microphone 318, and display 312. In some embodiments, display 312 may be a television display or a computer display. In some embodiments, set top box 316 may be communicatively connected to user interface input 310. In some embodiments, user interface input 310 may be a remote control device. Set-top box 316 may include one or more circuit boards. In some embodiments, the circuit boards may include processing circuitry, control circuitry, and storage (e.g., RAM, ROM, Hard Disk, Removable Disk, etc.). In some embodiments, circuit boards may include an input/output path. More specific implementations of devices are discussed below in connection with FIG. 4. Each one of device 300 and user equipment system 301 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a application stored in memory (e.g., storage 308). Specifically, control circuitry 304 may be instructed by the application to perform the functions discussed above and below. For example, the application may provide instructions to control circuitry 304 to monitor words spoken by a user and determine whether they match words in the content that is being output. In some implementations, any action performed by control circuitry 304 may be based on instructions received from the application.

In client-server based embodiments, control circuitry 304 may include communications circuitry suitable for communicating with a content application server or other networks or servers. The instructions for carrying out the above-mentioned functionality may be stored on the content application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of devices, or communication of devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein, including, for example, different versions of content having specific audio tracks suppressed, as well as content data described above including dialogue transcripts that can be used for matching. Nonvolatile memory may also be used (e.g., to launch a boot-up routine and other instructions). Cloud-based storage, described in relation to FIG. 4, may be used to supplement storage 308 or instead of storage 308. In some embodiments, a database is accessible at the cloud-based storage, where the database stores audio tracks of content, a look-up table mapping Mel-frequency Cepstral Coefficients to sounds both lexical and non-lexical, any suitable reference for control circuitry to retrieve when processing speech or mapping speech to words, or any suitable combination thereof.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the device to receive and to display, to play, or to record content. The tuning and encoding circuitry may also be used to receive content data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of each one of device 300 and user equipment system 301. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of each one of device 300 and user equipment system 301 or may be stand-alone units. The audio component of videos and other content displayed on display 312 may be played through speakers 314. In some embodiments, the audio may be distributed to a receiver (not shown), which processes and outputs the audio via speakers 314. Microphone 318 may be provided as integrated with other elements of each one of device 300 and user equipment system 301 or may be a stand-alone unit. Microphone 318 can be any suitable device capable of receiving and converting sound into an electrical audio signal (e.g., digital or analog). Microphone 318 may receive sounds made by users as well as the audio component of content that is played through speakers 314. Device 300 may include an embedded microphone 318 integrated with control circuitry 304. Microphone 318 outputs the audio signal to control circuitry 304. Control circuitry 304 may monitor the audio signal to determine words spoken by the user and compare the words to the dialogue of content that is presented.

The content application may be implemented using any suitable architecture. For example, it may be a stand-alone application wholly-implemented on each one of device 300 and user equipment system 301. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310.

In some embodiments, the application is a client-server based application. Data for use by a thick or thin client implemented on each one of device 300 and user equipment system 301 is retrieved on-demand by issuing requests to a server remote to each one of device 300 and user equipment system 301. In one example of a client-server based content application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive audio signals from the user via microphone 318 and transmit the audio signals to the remote server for processing. The remote server may process the audio signals to detect sounds made by the user and determine words spoken by the user. The determined words are then transmitted to equipment device 300 for comparison to dialogue of the content. When the words spoken by the user match the dialogue of the content, the content application (e.g., implemented on control circuitry 304) can suppress the dialogue of the content.

In some embodiments, the content application is downloaded and interpreted or otherwise run by an interpreter or virtual machine (run by control circuitry 304). In some embodiments, the content application may be encoded in the ETV Binary Interchange Format (EBIF), received by control circuitry 304 as part of a suitable feed, and interpreted by a user agent running on control circuitry 304. For example, the content application may be an EBIF application. In some embodiments, the content application may be defined by a series of JAVA-based files that are received and run by a local virtual machine or other suitable middleware executed by control circuitry 304. In some of such embodiments (e.g., those employing MPEG-2 or other digital media encoding schemes), the content application may be, for example, encoded and transmitted in an MPEG-2 object carousel with the MPEG audio and video packets of a program.

Figure 4:
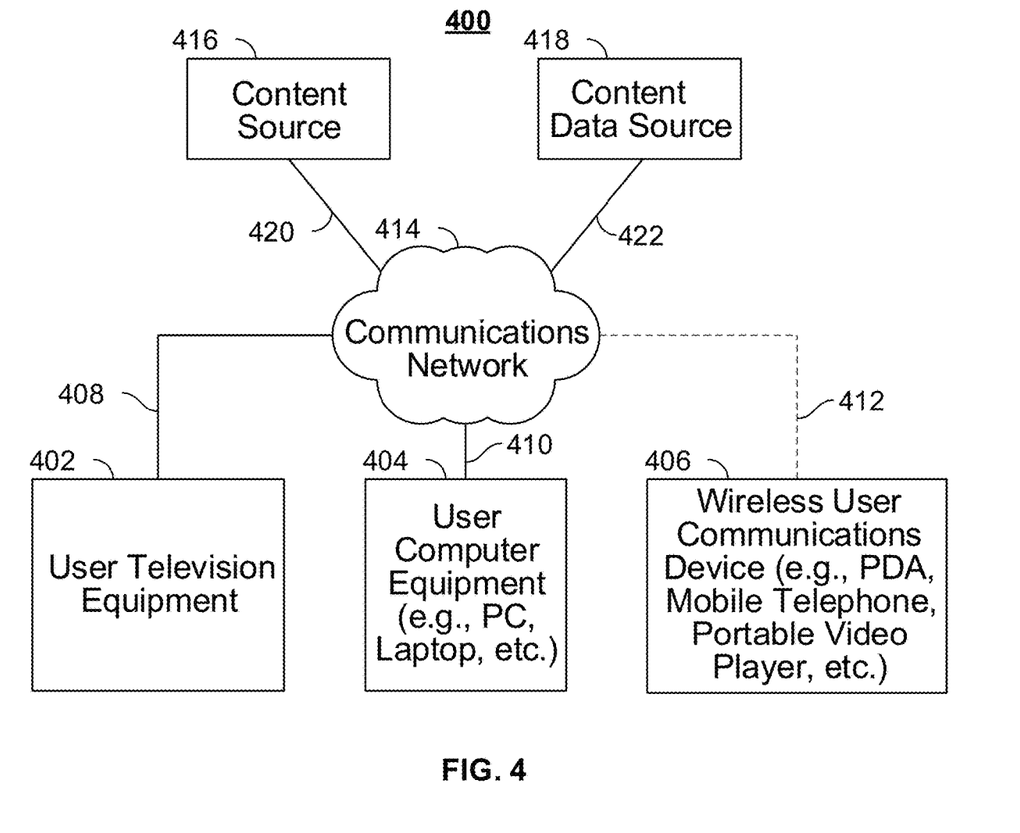
FIG. 4 is a block diagram of an illustrative content output system, in accordance with some embodiments of the disclosure.

Each one of device 300 and user equipment system 301 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or devices and may be substantially similar to devices described above. Devices, on which a application may be implemented, may function as a standalone device or may be part of a network of devices. Various network configurations of devices may be implemented and are discussed in more detail below.

A device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The application may have the same layout on various different types of user equipment or may be tailored to the display capabilities of the user equipment. For example, on user computer equipment 404, the content application may be provided as a web site accessed by a web browser. In another example, the content application may be scaled down for wireless user communications devices 406.

In system 400, there is typically more than one of each type of device but only one of each is shown in FIG. 4 to avoid overcomplicating the drawing. In addition, each user may utilize more than one type of device and also more than one of each type of device.

In some embodiments, a device (e.g., user television equipment 402, user computer equipment 404, wireless user communications device 406) may be referred to as a "second device." For example, a second device may provide an interface for adjusting settings and display preferences of the first device. In some embodiments, the second device is configured for interacting with other second devices or for interacting with a social network. The second screen device can be located in the same room as the first device, a different room from the first device but in the same house or building, or in a different building from the first device.

The user may also set various settings to maintain consistent application settings across in-home devices and remote devices. For example, if a user enables suppression of audio tracks on their personal computer at their office, this feature would also be enabled on the user's in-home devices (e.g., user television equipment and user computer equipment) as well as the user's mobile devices, if desired. Therefore, changes made on one device can change the content experienced on another device, regardless of whether they are the same or a different type of device. In addition, the changes made may be based on settings input by a user, as well as user activity monitored by the content application. In addition, two devices can work together to provide functionality for the user. For example, a first device can monitor a user's sounds and instruct a second device to suppress audio content when the user's sounds match the sounds of content being presented on the second device.

The devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the devices may be provided by one or more of these communications paths but are shown as a single path in FIG. 4 to avoid overcomplicating the drawing.

Although communications paths are not drawn between devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 402-11x, etc.), or other short-range communication via wired or wireless paths. BLUETOOTH is a certification mark owned by Bluetooth SIG, INC. The devices may also communicate with each other directly through an indirect path via communications network 414.

System 400 includes content source 416 and content data source 418 coupled to communications network 414 via communication paths 420 and 422, respectively. Paths 420 and 422 may include any of the communication paths described above in connection with paths 408, 410, and 412. Communications with the content source 416 and content data source 418 may be exchanged over one or more communications paths but are shown as a single path in FIG. 4 to avoid overcomplicating the drawing. In addition, there may be more than one of each of content source 416 and content data source 418, but only one of each is shown in FIG. 4 to avoid overcomplicating the drawing. If desired, content source 416 and content data source 418 may be integrated as one source device. Although communications between sources 416 and 418 with devices 402, 404, and 406 are shown as through communications network 414, in some embodiments, sources 416 and 418 may communicate directly with devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters), intermediate distribution facilities and/or servers, Internet providers, on-demand content servers, and other content providers. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote content server used to store different types of content (including video content selected by a user), in a location remote from any of the devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Content data source 418 may provide data related to the content. Content data may be provided to the devices using any suitable approach. In some embodiments, the content application may be a stand-alone interactive television program guide that receives program guide data via a data feed (e.g., a continuous feed or trickle feed). Program schedule data and other content data may be provided to the user equipment on a television channel sideband, using an in-band digital signal, using an out-of-band digital signal, or by any other suitable data transmission technique. Program schedule data and other content data may be provided to user equipment on multiple analog or digital television channels.

In some embodiments, content data from content data source 418 may be provided to user's equipment using a client-server approach. For example, a user equipment device may pull content data from a server, or a server may push content data to a user equipment device. In some embodiments, a content application client residing on the user's equipment may initiate sessions with source 418 to obtain content data when needed, e.g., when the content data is out of date or when the device requests the data. Content data may be provided to the user equipment with any suitable frequency (e.g., continuously, daily, a user-specified period of time, a system-specified period of time, in response to a request from user equipment, etc.). Content data source 418 may provide devices 402, 404, and 406 the application itself or software updates for the application.

In some embodiments, the content data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The content data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The content data may include a model (e.g., a survivor model) used for generating a score that indicates a likelihood a given user will terminate access to a service/source. For example, the application may monitor a user's engagement with content to generate a value or score that indicates a likelihood of whether the given user will terminate access to a particular service or source. In particular, a higher score may indicate a higher level of confidence that the user will terminate access to a particular service or source. Based on the score, the application may generate promotions that entice the user to keep the particular service or source indicated by the score as one to which the user will likely terminate access. The content data may include audio data about content. For example, the audio data may include a transcript of words in the content and the timing of the words. The transcript of words may be text or other representations of words (e.g., Mel-frequency cepstral coefficients). As another example, the audio data may include audio features such as intonation, pitch, volume, spectral roll-off, spectral flux, the spectral centroid.

Applications may be, for example, stand-alone applications implemented on devices. For example, the application may be implemented as software or a set of executable instructions which may be stored in storage 308 and executed by control circuitry 304 of each one of device 300 and user equipment system 301. In some embodiments, applications may be client-server applications where only a client application resides on the device, and server application resides on a remote server. For example, applications may be implemented partially as a client application on control circuitry 304 of each one of device 300 and user equipment system 301 and partially on a remote server as a server application (e.g., content data source 418) running on control circuitry of the remote server. When executed by control circuitry of the remote server (such as content data source 418), the application may instruct the control circuitry to generate the content displays and transmit the generated displays to the devices. The server application may instruct the control circuitry of the content data source 418 to transmit data for storage on the device. The client application may instruct control circuitry of the receiving user equipment to generate the content displays.

Content and/or content data delivered to devices 402, 404, and 406 may be over-the-top (OTT) content. OTT content delivery allows Internet-enabled user devices, including any device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide content data described above.

Content output system 400 is intended to illustrate a number of approaches, or network configurations, by which devices and sources of content and content data may communicate with each other for the purpose of accessing content and providing the ability to modify content in response to user engagement. The embodiments described herein may be applied in any one or a subset of these approaches, or in a system employing other approaches for delivering content. The following four approaches provide specific illustrations of the generalized example of FIG. 4.

In one approach, devices may communicate with each other within a home network. Devices can communicate with each other directly via short-range point-to-point communication schemes described above, via indirect paths through a hub or other similar device provided on a home network, or via communications network 414. Each of the multiple individuals in a single home may operate different devices on the home network. As a result, it may be desirable for various content application information or settings to be communicated between the different devices. For example, it may be desirable for users to maintain consistent application settings on different devices within a home network, as described in greater detail in Ellis et al., U.S. Patent Publication No. 2005/0251827, filed Jul. 11, 2005. Different types of devices in a home network may also communicate with each other to transmit content. For example, a user may transmit content from user computer equipment to a portable video player or portable music player. As another example, a wireless communication device may detect sounds made by a user and transmit the sounds to user television equipment for it to determine whether to suppress dialogue of content being output.

In a second approach, users may have multiple types of user equipment by which they access content. For example, some users may have home networks that are accessed by in-home and mobile devices. Users may control in-home devices via a application implemented on a remote device. For example, users may access an online application on a website via a personal computer at their office, or a mobile device such as a PDA or web-enabled mobile telephone. The user may set various settings (e.g., recordings, reminders, audio suppression enablement, or other settings) on the online content application to control the user's in-home equipment. The online application may control the user's equipment directly, or by communicating with a application on the user's in-home equipment. Various systems and methods for devices communicating, where the devices are in locations remote from each other, is discussed in, for example, Ellis et al., U.S. Pat. No. 8,046,801, issued Oct. 25, 2011, which is hereby incorporated by reference herein in its entirety.

In a third approach, users of devices inside and outside a home can use their application to communicate directly with content source 416 to access content. Specifically, within a home, users of user television equipment 402 and user computer equipment 404 may access the application to navigate among and locate desirable content. Users may also access the application outside of the home using wireless user communications devices 406 to navigate among and locate desirable content.

In a fourth approach, devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more content data sources 418. In addition or in the alternative, the remote computing sites may include other devices, such as user television equipment 402, user computer equipment 404, and wireless user communications device 406. For example, the other devices may provide access to a stored copy of a video or a streamed video. In such embodiments, devices may operate in a peer-to-peer manner without communicating with a central server.

The cloud provides access to services, such as content storage, content sharing, or social networking services, among other examples, as well as access to any content described above, for devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a device to store content to the cloud and to receive content from the cloud rather than storing content locally and accessing locally-stored content.

Cloud resources may be accessed by a device using, for example, a web browser, a application, a desktop application, a mobile application, and/or any combination of access applications of the same. The device may be a cloud client that relies on cloud computing for application delivery, or the device may have some functionality without access to cloud resources. For example, some applications running on the device may be cloud applications, i.e., applications delivered as a service over the Internet, while other applications may be stored and run on the device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, devices can use cloud resources for processing operations such as the processing operations performed by processing circuitry described in relation to FIG. 3.

Any one or more of device 300 and user equipment system 301 of FIG. 3 and user television equipment 402, user computer equipment 404, and wireless user communications device 406 of FIG. 4, can be used to modify the audio content being presented to a user. For example, the devices of the present disclosure can suppress a vocal track of content in response to a user reciting the words of the vocal track. Further details of the present disclosure are discussed below in connection with the flowcharts of FIGS. 5-7.

Figure 5:
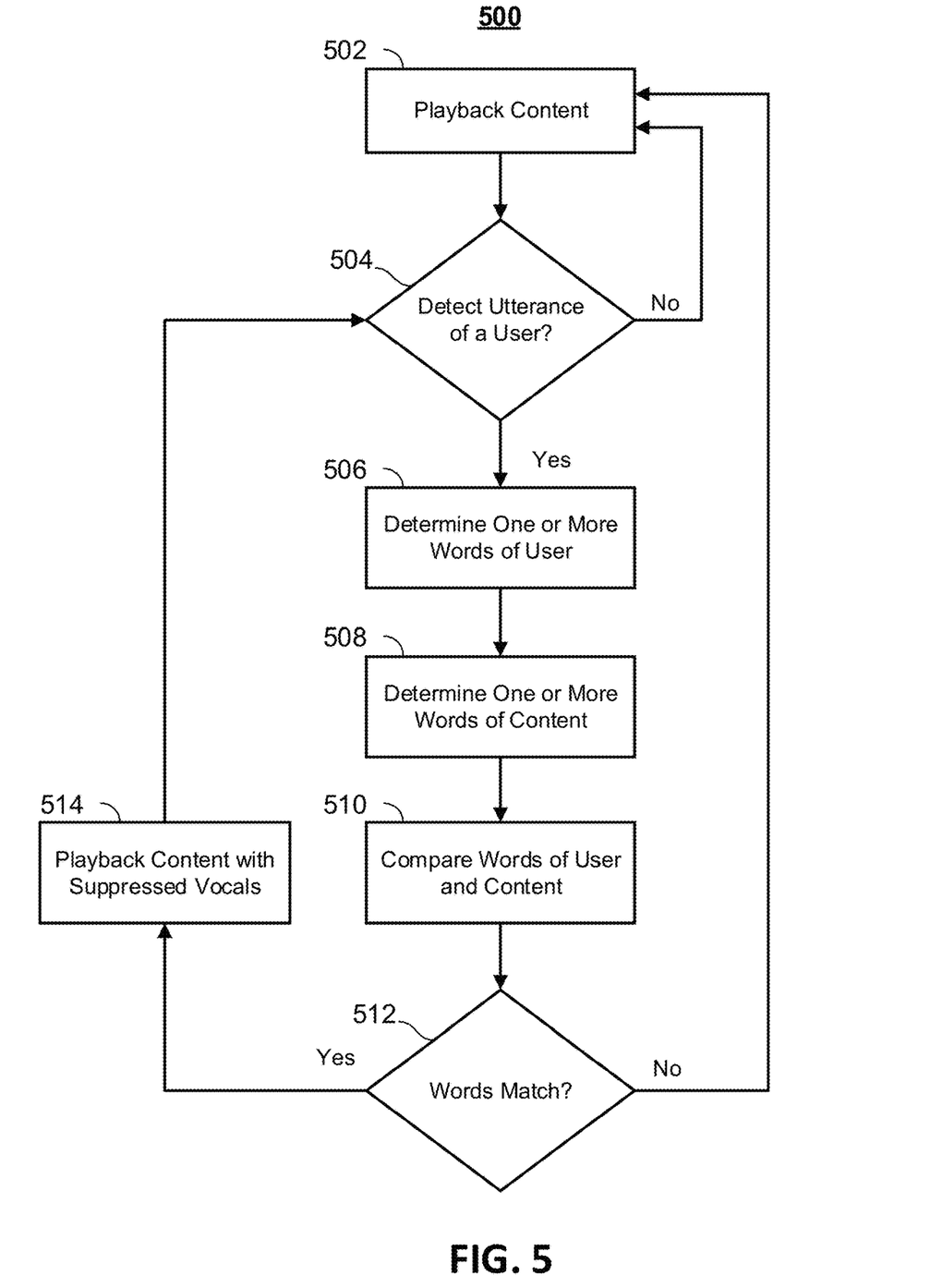
FIG. 5 depicts an illustrative flowchart of a process for suppressing the vocal track of content, in accordance with some embodiments of the disclosure.

FIG. 5 depicts an illustrative flowchart of a process 500 for suppressing the vocal track of content, in accordance with some embodiments of the disclosure. It should be noted that the steps of process 500 can be performed by control circuitry 140 of FIGS. 1-2, control circuitry 304 of FIG. 3, or any of the system components shown in FIGS. 1-4. Control circuitry 140 may be part of device 110 (e.g., a device which may have any or all of the functionality of user television equipment 402, user computer equipment 404, and/or wireless communications device 406 of FIG. 4), part of a remote server separated from the user equipment by way of a communication network (e.g., communication network 414 of FIG. 4), or distributed over a combination of both.

At step 502, the system outputs content. The system may retrieve the content locally (e.g., from storage 308 of FIG. 3) or remotely (e.g., from content source 416 of FIG. 4) for output. The content can be any suitable content. For example, the content may be a movie or a short film created by independent content creators. As another example, the content may be a podcast, radio channel, any suitable presentable content or any suitable combination thereof. The content may include audio content or audio and visual content. The audio content may include one or more audio tracks.

At step 504, the system detects an utterance of a user. An utterance of a user can include any sounds made by the user, including words spoken by the user. For example, the user may recite memorable lines of a movie while the movie is being played. As another example, the user may be talking with a friend while the movie is being played. In a further example, the user may recite the catchphrase of a radio host whose show is being broadcast. In some embodiments, a microphone (e.g., microphone 318 of FIG. 3) detects the utterance of the user. In some embodiments, control circuitry (e.g., control circuitry 140 of FIGS. 1-2) detects the utterance of the user. For example, the control circuitry can detect when an audio signal received from a microphone is received or includes audio content.

Figure 6:
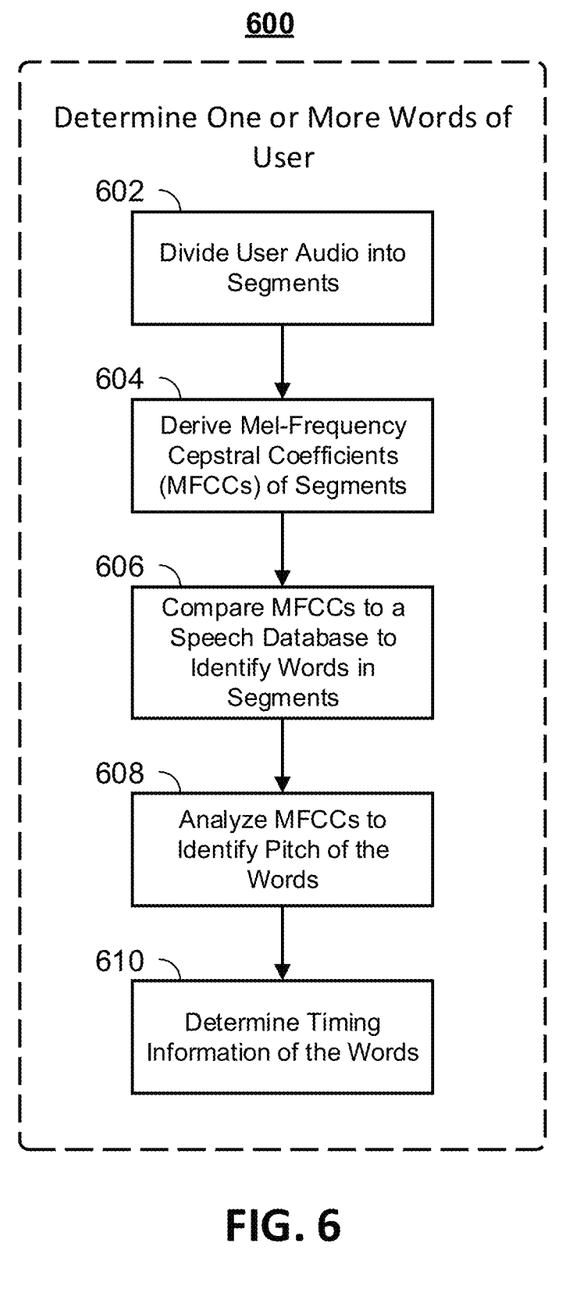
FIG. 6 depicts an illustrative flowchart of a process for determining one or more words in user utterances, in accordance with some embodiments of the disclosure.

At step 506, the system determines one or more words of the user (e.g., from the detected utterance). As referred to herein, the term "determines one or more words" or "determining one or more words" should be understood to refer to the determining diction, language, audio characteristics (e.g., pitch, intonation, etc.), meaning of the words, non-linguistic sounds, any suitable lexical or non-lexical representation of communication, or any suitable combination thereof. In some embodiments, the one or more words comprise the tune of a song that the user hums. For example, a movie may include an audio track containing an orchestral composition that the user hums along to. Furthermore, the system may determine that the user recites words corresponding to a dialogue track of a movie. As another example, the user may mimic the engine noises made by racing cars presented in the audio track of an audiobook that is presented by a device. The system may use any suitable technique for converting sounds to words. In some embodiments, the process of FIG. 6 may be used to perform step 506. FIG. 6 is discussed further below.

At step 508, the system determines one or more words in the audio of the content being output. In some embodiments, the control circuitry and the device outputting the content are communicatively linked such that the system can determine the one or more words by associating the time of the content being presented to an annotated script stored on a cloud-based server. For example, the system can look up the one or more words from a database of scripts that have each line or word annotated with its respective output time. Thus, the current output time of the content can be used to determine the word or words of the content. In some embodiments, the system may determine the one or more words of the content in the same way that the one or more words of the user are determined. For example, if the control circuitry does not have access to a transcript of the content, the control circuitry can use the same techniques of step 506 to convert the audio of the content to words. The control circuitry can operate on the audio directly from the content file or from an audio signal generated from a microphone (e.g., a microphone of a wireless communication device that is in audible range of speakers playing the audio of the content).

Figure 7:
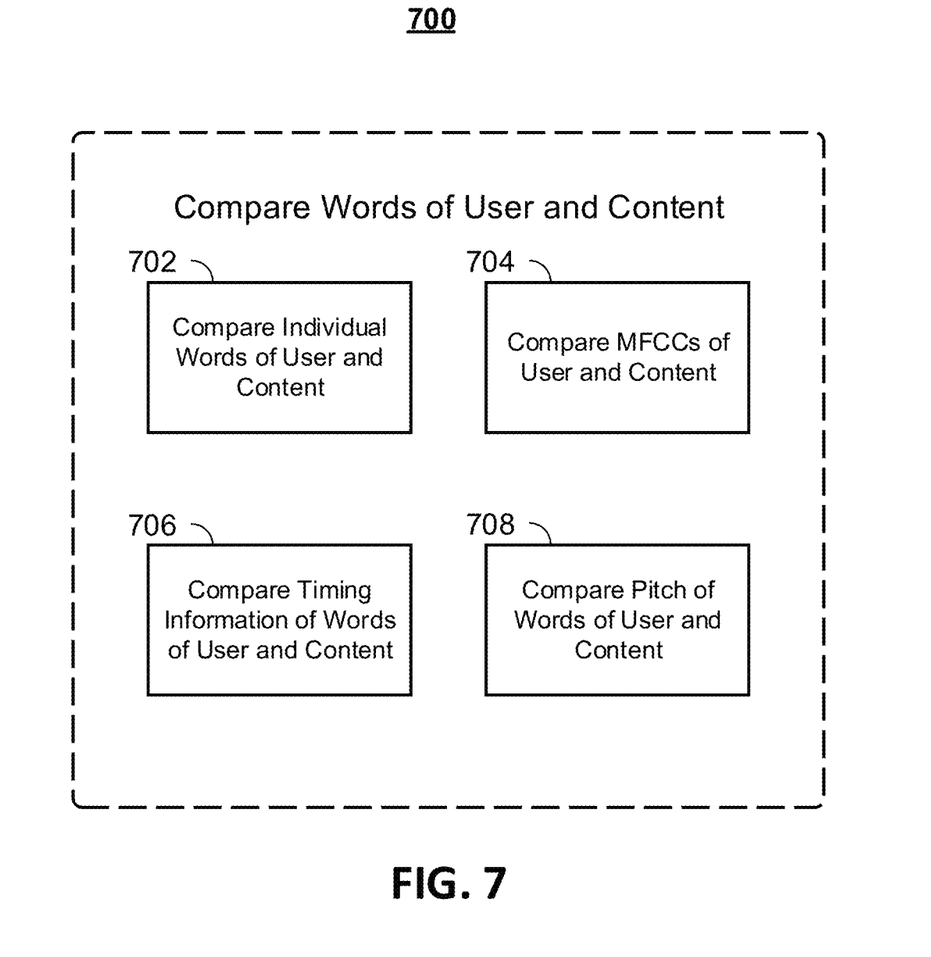
FIG. 7 depicts a chart of illustrative processes to compare words of the user and content, in accordance with some embodiments of the disclosure.

At step 510, the system compares the words of the user and the words of the content. In some embodiments, the system compares the textual words determined in step 506 (e.g., using a speech to text conversion) to the textual words determined in step 508 (e.g., using a time-annotated script of the movie). For example, the system may perform a string comparison of the words of the user to the words of the content. As referred to herein, the term "compares words" or "comparing words" should be understood to refer to the comparing of text (e.g., comparing speech converted to text against a movie script), audio signals represented electronically over time, representations of audio signals such as the meaning of the words, MFCCs, timing of words, spectrographic representations, spectral roll-off, spectral flux, spectral centroid, time-frequency representation, any suitable encoding or representation of audio signals, or any suitable combination thereof. In some embodiments, the system compares both the representation of the lexical components and the time between them in an audio track of a movie. For example, the system uses the pause between spoken words in the dialogue line "You shall not pass"—a one-second pause between "You" and "shall," no pause between "shall" and "not," and a two-second pause between "not" and "pass"—to compare to the user's spoken words and corresponding pauses. In some embodiments, the words of the user and the words of the content are represented by their frequency signatures, the change over time in those frequency signatures, any suitable representation of the words based on their frequency components, or any suitable combination thereof. In some embodiments, the process of FIG. 7 may be used to perform step 510. FIG. 7 is discussed further below.

At step 512, the system determines if the words of the user and the words of the content match. Determining a match may refer to determining equivalence, a value greater or less than a predefined comparator value or threshold, an analogous equivalence, any other suitable determination of a match, or any suitable combination thereof. In some embodiments, the system determines that the frequency signature of the voice over time matches the dialogue track presented by a movie. For example, a user humming along to a movie, and the pitch of the humming, can be used in place of textual words to identify a match between the user utterance and the audio of the content. In another example, a user is singing along, off-pitch, to a musical performance in a movie. Due to the inaccurate pitch of the user, the system cannot match user audio MFCCs to the content MFCCs. The system instead determines a match based on a speech-to-text conversion of what the user is saying and determines a match with the movie script retrieved from a local storage on the user device.

When the system determines, at step 512, that the words match, the system outputs the content with suppressed vocals (e.g., without the dialogue track) at step 514. The content audio track may comprise a combination of audio files including a background audio file and a dialogue file. In some embodiments, the system uses a stored copy of the background audio file to suppress vocals. To do so, the system may switch output from the content audio track to output of only the background audio file. The audio files may be stored locally on the device or on a cloud-based server. In scenarios where the background audio file is not available to the system, the system may use adaptive filtering or noise cancellation by treating the dialogue file as noise to remove from the content audio track that has both the background audio file and the dialogue file. When the words at step 512 do not match, the system will return to step 502, continuing output of the content without suppressing the vocals. Furthermore, the system may repeat steps 504 through 512 to determine whether user utterances continue to match words of the content audio track. It will be understood that process 500 is merely illustrative and that various modifications can be made in accordance with the present disclosure.

FIG. 6 depicts an illustrative flowchart of a process 600 for determining one or more words in user utterances, in accordance with some embodiments of the disclosure. It should be noted that the steps of process 600 can be performed by control circuitry 140 shown in FIGS. 1-2, control circuitry 304 of FIG. 3, or any of the system components shown in FIGS. 1-4. In some embodiments, prior to any or all of the steps in process 600, the system identifies the user by voice or by image processing in a surveying camera to distinguish the user from other voices in the room who are not interacting with the content.

At step 602, the system divides the user audio into segments. In some embodiments, the system may divide the user audio into sections believed to contain words and pauses by detecting when the frequency signature of the user audio over time has no energy in the frequencies corresponding to human vocals. For example, the frequency signature when the user mimics lines may be centered around 880 and 3500 Hertz (e.g., spectral centroids around 880 and 3500 Hertz), and the frequency response of user silence will not have any spectral centroid. The system may also try to divide a single word into segments. For example, if the user audio comprises the nonsense word "supercalifragilisticexpialidocious," the system may divide the user audio into segments of "super," "cali," "fragilistic," and "expialidocious." In some embodiments, the system may divide the user audio into multiple overlapping segments of varying widths.

At step 604, the system derives the MFCCs of the segments. In some embodiments, the system determines the amplitude in decibels of the power over time of the frequency signatures of the audio segments. The system can derive MFCCs based on the application of spaced bandpass filters to calculate the energies in sections of the frequency spectrum and taking a discrete cosine transform of the respective energies. The MFCCs may also be derived based upon an application of a short-time Fourier transform on each audio segment. In some embodiments, a filtering window is applied to each segment prior to determining the frequency signature power levels over time (e.g., taking the convolution of the audio segment and a Blackman window in the time domain). The MFCCs may be arranged as MFCC feature vectors that describes the amplitude in decibels of the frequency spectrum of a segment.

At step 606, the system compares the MFCCs to a speech database to identify words in the segments. In some embodiments, the speech database may comprise words as represented by their MFCC or frequency signatures when spoken in varying pitches. For example, the MFCC may comprise representations of high energy frequency spectrum bands whose spectral centroids are an exact or approximate match to the spectral centroids of the frequency responses in the speech database. In one aspect, the speech database comprises words represented by their MFCC feature vectors that are compared to MFCC features determined by step 604. In some embodiments, words are determined when the MFCC of the segment sufficiently matches the MFCC of a word in the speech database. It will be understood that not every segment will contain a word and that some comparisons will result in no matches being found.

At step 608, the system analyzes the MFCCs to identify the pitch of the words. In some embodiments, the MFCCs represent the spectral energy in frequency bands specified by the width of the filters applied to the audio segments. For example, the system can analyze movie audio to determine the spectral energy of a word is the largest in a frequency band produced by a filter centered around 261.63 Hertz (e.g., the pitch of the word being recited is closest to Middle C).

At step 610, the system determines the timing information of the words. In some embodiments, the system may determine timing information by using the MFCC derived in step 604 and the word comparison in step 606 to demarcate the start and stop times of each word in the user audio. For example, comparing the MFCC representation of the user audio to a database of words and their MFCC representations determines that the words "I never look back, darling" were said by the user and the lack of MFCCs between the words spoken can be used to show how long each pause between words takes and to calculate the amount of time taken to say each word.

It will be understood that process 600 is merely illustrative and that various modifications can be made in accordance with the present disclosure. For example, in some embodiments, one or both of steps 608 and 610 may be omitted.

FIG. 7 depicts a chart 700 of illustrative processes to compare words of the user and content, in accordance with some embodiments of the disclosure. It should be noted that the processes in chart 700 can be performed by control circuitry 140 shown in FIGS. 1-2, control circuitry 304 of FIG. 3, or any of the system components shown in FIGS. 1-4.

Process 702 compares individual words of the user and words of the content. This comparison may be a string comparison. For example, the text of a movie script may be compared to the text generated from a speech-to-text processor operating on a user's utterances. In some embodiments, the individual words' meanings may be compared. The meanings of words may be similar, and the system can account for user errors when reciting a line incorrectly. For example, the user may say "I fired first" when the correct line in the movie script is "I shot first." The words "fired" and "shot" have similar meanings in this example. In such a situation, the system may choose to suppress the remaining dialogue track in the content if the user continues to engage with the movie by reciting the rest of the dialogue.

Process 704 compares MFCCs of the user audio to MFCCs of the audio (e.g., dialogue track) of the content. For example, the MFCCs of both the user audio and the content audio may be compared and found to both show high spectral energy in certain frequency bands, indicating that the user is mimicking the pitch of the audio track of the content. As another example, the comparison of the MFCC representation of a user humming the theme song of a television series may be found to have a variation in frequency signature composition over time that matches the frequency signature variations of the theme song. In some embodiments, the MFCCs of the content audio may be obtained by processing the dialogue track of the content.

Process 706 compares the timing information of the words of the user and words of the content. In some embodiments, the system compares the lengths of words and pauses from the user to the lengths of words and pauses in the content. For example, the content may include a dialogue with dramatic pauses taken in between words. The system may use MFCCs and frequency signatures of the user audio to determine the length of time for which words are spoken and pauses are taken. For example, a user audio comprising the phrase "Here we go" can be identified by length of word or pause: "here" lasts 0.4 seconds, a pause between "here" and "we" lasts 1 seconds, "we" lasts 0.2 seconds, a pause between "we" and "go" lasts 1.6 seconds, and "go" lasts 5 seconds. The timing information (e.g., the lengths of the words and pauses) of the user audio can be compared to the timing information of the content audio track. In another example, the content may include a fast-paced dialogue with no pauses taken between words. The system may segment the user audio into permutations of possible words by applying windowing filters of varying sizes to the user audio in the time domain and mapping the possible words to words in a speech database. The system can compare these mapped words to the movie script in addition to comparing the time of the apparent long, nonsense word that is the delivery of a line with no pauses.

Process 708 compares the pitch of the words of the user and words of the content. For example, the dialogue track of the content may be delivered by a character with a very high-pitched voice that the user emulates as he or she recites the line. The system can determine the pitch of the user (e.g., using control circuitry) and compare the pitch of the user audio to the pitch of the content audio track. The data representation of the pitch of the content audio track may be stored in device 110 or remotely in a cloud-based server that is communicatively linked to control circuitry 140.

It will be understood that chart 700 shows illustrative processes that can be used to compare words of the user and the content audio track and that various modifications can be made in accordance with the present disclosure. In some embodiments, only a single process shown in FIG. 7 is used to compare words of the user and content. In some embodiments, any combination of two or more processes shown in FIG. 7 are used to compare words of the user and content.

It will also be understood that the principles of the present disclosure can also be applied to other types of sounds. In some embodiments, content can be modified in response to sounds from musical instruments. For example, if a user is playing a piano to follow along with the soundtrack of movie, the system can modify output of the movie to suppress all of or part of (e.g., the piano component) the soundtrack.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for suppressing vocal tracks in content upon detection of corresponding words, the method comprising:
   detecting, during output of content, an utterance of a user, wherein the content comprises a vocal track and at least one additional audio track;
   determining at least one first word in the detected utterance;
   determining at least one second word included in a portion of the content that was output at a time when the at least one first word was uttered;
   comparing the at least one first word in the detected utterance of the user with the at least one second word included in the portion of the content;
   determining, based on the comparing, that the at least one first word in the detected utterance of the user matches the at least one second word included in the portion of the content; and
   in response to determining that the at least one first word matches the at least one second word, suppressing output of the vocal track of the content.

2. The method of claim 1, further comprising:
subsequent to determining that the at least one first word matches the at least one second word:
determining at least one additional word included in a portion of the content that was output;
comparing the at least one additional word with the utterance;
determining, based on comparing the at least one additional word with the utterance, that the at least one additional word does not match the utterance; and
in response to determining that the at least one additional word does not match the utterance, continuing output of the vocal track of the content.

3. The method of claim 1, wherein determining at least one second word included in a portion of the content comprises accessing a transcript of the content based on output time.

4. The method of claim 1, wherein determining at least one second word included in a portion of the content comprises analyzing an audio component of the content.

5. The method of claim 1, wherein:
a device is used to output the content;
the device comprises a microphone; and
the microphone is used to detect the utterance.

6. The method of claim 1, wherein determining the at least one first word in the detected utterance comprises:
extracting features of the detected utterance; and
comparing the extracted features to a speech database, and
wherein extracting features of the detected utterance comprises deriving Mel-frequency cepstral coefficients of the detected utterance.

7. The method of claim 1, wherein the determining, based on the comparing, that the at least one first word in the detected utterance of the user matches the at least one second word included in the portion of the content includes one or more of:
comparing a fraction of the at least one first word with a fraction of the at least one second word;
determining with control circuitry included in a voice assistant whether the at least one first word matches the at least one second word, wherein the control circuitry and the voice assistant are provided in a single device further configured to output the content;
determining equivalence, a value greater or less than a predefined comparator value or threshold, an analogous equivalence, any other suitable determination of a match of the at least one first word and the at least one second word, or any suitable combination thereof;
determining that a frequency signature of the at least one first word over time matches the at least one second word; and
determining that Mel-frequency cepstral coefficients (MFCC) of the at least one first word sufficiently matches the MFCC of the at least one second word.

8. The method of claim 1, wherein the at least one first word comprises a plurality of first words and the at least one second word comprises a plurality of second words, the method further comprising:
determining timing information of the plurality of first words, and
wherein determining a match further comprises determining that the timing information of the plurality of first words matches timing information of the plurality of second words.

9. The method of claim 1, wherein suppressing output of the vocal track of the content comprises applying a filter to remove a vocal component of the content.

10. The method of claim 1, wherein:
the content comprises a first version including a vocal component and a second version not including the vocal component; and
suppressing output of the vocal track of the content comprises switching output from the first version of the content to the second version of the content.

11. A system for suppressing vocal tracks in content upon detection of corresponding words, the system comprising:
a microphone configured to detect, during output of content, an utterance of a user, wherein the content comprises a vocal track and a musical track; and
control circuitry configured to:
determine at least one first word in the detected utterance;
determine at least one second word included in a portion of the content that was output at a time when the at least one first word was uttered;
compare the at least one first word in the detected utterance of the user with the at least one second word included in the portion of the content;
determine, based on the comparing, that the at least one first word in the detected utterance of the user matches the at least one second word included in the portion of the content; and
in response to determining that the at least one first word matches the at least one second word, suppress output of the vocal track of the content.

12. The system of claim 11, wherein the control circuitry is further configured to:
subsequent to determining that the at least one first word matches the at least one second word:
determine at least one additional word included in a portion of the content that was output;
compare the at least one additional word with the utterance;
determine, based on comparing the at least one additional word with the utterance, that the at least one additional word does not match the utterance; and
in response to determining that the at least one additional word does not match the utterance, continuing output of the vocal track of the content.

13. The system of claim 11, wherein determining at least one second word included in the portion of the content comprises accessing a transcript of the content based on output time.

14. The system of claim 11, wherein determining at least one second word included in the portion of the content comprises analyzing an audio component of the content.

15. The system of claim 11, wherein:
a device is used to output the content; and
the microphone is used to detect the utterance.

16. The system of claim 11, wherein determining the at least one first word in the detected utterance comprises:
extracting features of the detected utterance; and
comparing the extracted features to a speech database, and
wherein extracting features of the detected utterance comprises deriving Mel-frequency cepstral coefficients of the detected utterance.

17. The system of claim 11, wherein:
the at least one first word comprises a plurality of first words;
the at least one second word comprises a plurality of second words;

the control circuitry is further configured to determine timing information of the plurality of first words; and determining a match further comprises determining that the timing information of the plurality of first words matches timing information of the plurality of second words.

18. The system of claim 11, wherein suppressing output of the vocal track of the content comprises applying a filter to remove a vocal component of the content.

19. The system of claim 11, wherein:
the content comprises a first version including a vocal component and a second version not including the vocal component; and
suppressing output of the vocal track of the content comprises switching output from the first version of the content to the second version of the content.

20. The system of claim 11, wherein the determining, based on the comparing, that the at least one first word in the detected utterance of the user matches the at least one second word included in the portion of the content includes one or more of:

comparing a fraction of the at least one first word with a fraction of the at least one second word;

determining with the control circuitry, which is included in a voice assistant, whether the at least one first word matches the at least one second word, wherein the microphone, the control circuitry and the voice assistant are provided in a single device further configured to output the content;

determining equivalence, a value greater or less than a predefined comparator value or threshold, an analogous equivalence, any other suitable determination of a match of the at least one first word and the at least one second word, or any suitable combination thereof;

determining that a frequency signature of the at least one first word over time matches the at least one second word; and determining that Mel-frequency cepstral coefficients (MFCC) of the at least one first word sufficiently matches the MFCC of the at least one second word.

* * * * *